(12) United States Patent
Craswell et al.

(10) Patent No.: US 10,057,415 B2
(45) Date of Patent: Aug. 21, 2018

(54) METHOD AND APPARATUS FOR REMOTE CONTROL AND UPDATING OF WIRELESS MOBILE DEVICES

(71) Applicant: Gula Consulting Limited Liability Company, Dover, DE (US)

(72) Inventors: Ronald J. Craswell, Redmond, WA (US); David S. Pratt, Jr., Seattle, WA (US); Paul J. Klassen, Newcastle, WA (US)

(73) Assignee: GULA CONSULTING LIMITED LIABILITY COMPANY, Dover, DE (US)

( * ) Notice: Subject to any disclaimer, the term of this patent is extended or adjusted under 35 U.S.C. 154(b) by 30 days.

(21) Appl. No.: 14/799,007

(22) Filed: Jul. 14, 2015

(65) Prior Publication Data
US 2015/0319299 A1    Nov. 5, 2015

Related U.S. Application Data

(63) Continuation of application No. 10/538,794, filed as application No. PCT/US03/32284 on Oct. 10, 2003, now abandoned.

(60) Provisional application No. 60/417,858, filed on Oct. 10, 2002, provisional application No. 60/417,905, filed on Oct. 10, 2002.

(51) Int. Cl.
| | | |
|---|---|---|
| *H04M 3/00* | (2006.01) | |
| *H04M 3/42* | (2006.01) | |
| *G06F 8/65* | (2018.01) | |
| *H04M 1/725* | (2006.01) | |
| *H04W 8/24* | (2009.01) | |
| *H04W 8/22* | (2009.01) | |

(52) U.S. Cl.
CPC .......... *H04M 3/42178* (2013.01); *G06F 8/65* (2013.01); *H04M 1/72525* (2013.01); *H04M 3/42144* (2013.01); *H04W 8/245* (2013.01); *H04W 8/22* (2013.01)

(58) Field of Classification Search
None
See application file for complete search history.

(56) References Cited

U.S. PATENT DOCUMENTS

| | | |
|---|---|---|
| 6,052,600 A | 4/2000 | Fette et al. |
| 6,321,275 B1 | 11/2001 | McQuistan et al. |
| 6,425,125 B1 * | 7/2002 | Fries .......................... G06F 8/68 717/168 |
| 6,622,017 B1 | 9/2003 | Hoffman |
| 6,643,506 B1 | 11/2003 | Criss et al. |
| 6,820,259 B1 | 11/2004 | Kawamata et al. |
| 6,928,579 B2 | 8/2005 | Aija et al. |
| 6,941,148 B2 | 9/2005 | Hansmann et al. |

(Continued)

*Primary Examiner* — Willie J Daniel, Jr.
(74) *Attorney, Agent, or Firm* — Panitch Schwarze Belisario & Nadel, LLP

(57) ABSTRACT

A method and apparatus are provided to in one aspect update data on a wireless mobile device. Available updates may include both mandatory and discretionary updates, where the mandatory updates are always installed on the wireless mobile device. In another aspect, a method and apparatus for of remotely instructing a wireless mobile device to perform a service is provided. The wireless mobile device receives a ping message that instructs it to retrieve further instruction for performing services actions on the wireless mobile device.

13 Claims, 8 Drawing Sheets

(56) References Cited

U.S. PATENT DOCUMENTS

| | | |
|---|---|---|
| 7,096,311 B2 | 8/2006 | Chiang |
| 7,275,243 B2 | 9/2007 | Gibbons et al. |
| 7,415,707 B2 | 8/2008 | Taguchi et al. |
| 2002/0016166 A1 | 2/2002 | Uchida et al. |
| 2002/0128029 A1 | 9/2002 | Nishikawa et al. |
| 2003/0022657 A1 | 1/2003 | Herschberg et al. |
| 2004/0203681 A1 | 10/2004 | Ross et al. |

* cited by examiner

METHOD AND APPARATUS FOR REMOTE CONTROL AND UPDATING OF WIRELESS MOBILE DEVICES

CROSS-REFERENCE TO RELATED APPLICATIONS

This application is a continuation of U.S. patent application Ser. No. 10/538,794, filed on Jun. 13, 2005 as a U.S. national-stage application of PCT International Application No. PCT/US03/32284, filed on Oct. 10, 2003, and which claims the benefit of U.S. Provisional Application No. 60/417,905, filed on Oct. 10, 2002, entitled, "UPDATE FOR WIRELESS MOBILE DEVICES," and U.S. Provisional Application No. 60/417,858, filed on Oct. 10, 2002, entitled, "REMOTE CONTROL FOR WIRELESS MOBILE DEVICES INCLUDING REMOTE LOCKING," the subject matter of all of which are incorporated herein by reference.

FIELD OF THE INVENTION

The present invention relates to the field of wireless communications. More specifically, the present invention relates to the provision of a remove control function from remotely controlling a wireless mobile device, including remotely locking the device; and additionally includes the provision of an update function for wireless devices.

BACKGROUND OF INVENTION

Since their introduction, the capabilities and number of services and features of wireless mobile devices have steadily increased while the cost of ownership and operation has decreased. At first, wireless mobile devices operated on analog wireless networks that established voice communications and simple paging features. Later, digital wireless networks were introduced for cellular telephone communications to provide more advanced features for voice and data communications, such as encryption, caller identification and transmitting and receiving Short Message Service ("SMS") text messages.

Some cellular telephones also incorporate many of the features originally provided for in the hand-held electronic devices, such as personal data assistants ("PDAs"). Relative simple PDA features such as keeping a list of contacts, a calendar, appointments and the like have been generally integrated into recent cellular telephone models.

Recently, some cellular telephones were enabled to allow the browsing of web pages on the Internet or other on-line services. More recently, Action Engine, Inc. of Redmond, Wash., assignee of the present invention, has developed and improved browserless approach to are consumed using wireless mobile devices, more user data, in particular, important, sensitive and/or critical data are being stored on the wireless mobile devices. In addition, as more and more types of software are implemented and/or installed on wireless mobile devices, the number of updates to the software has increased as well. Additionally, as wireless mobile devices become more sophisticated, users may not be able to keep track of the current state of development in their software and other data on their wireless mobile devices.

BRIEF DESCRIPTION OF DRAWINGS

The present invention will be described by way of exemplary embodiments, but not limitations, illustrated in the accompanying drawings in which like references denotes similar elements, and in which.

DETAILED DESCRIPTION OF EMBODIMENTS OF THE INVENTION

Figure 1:
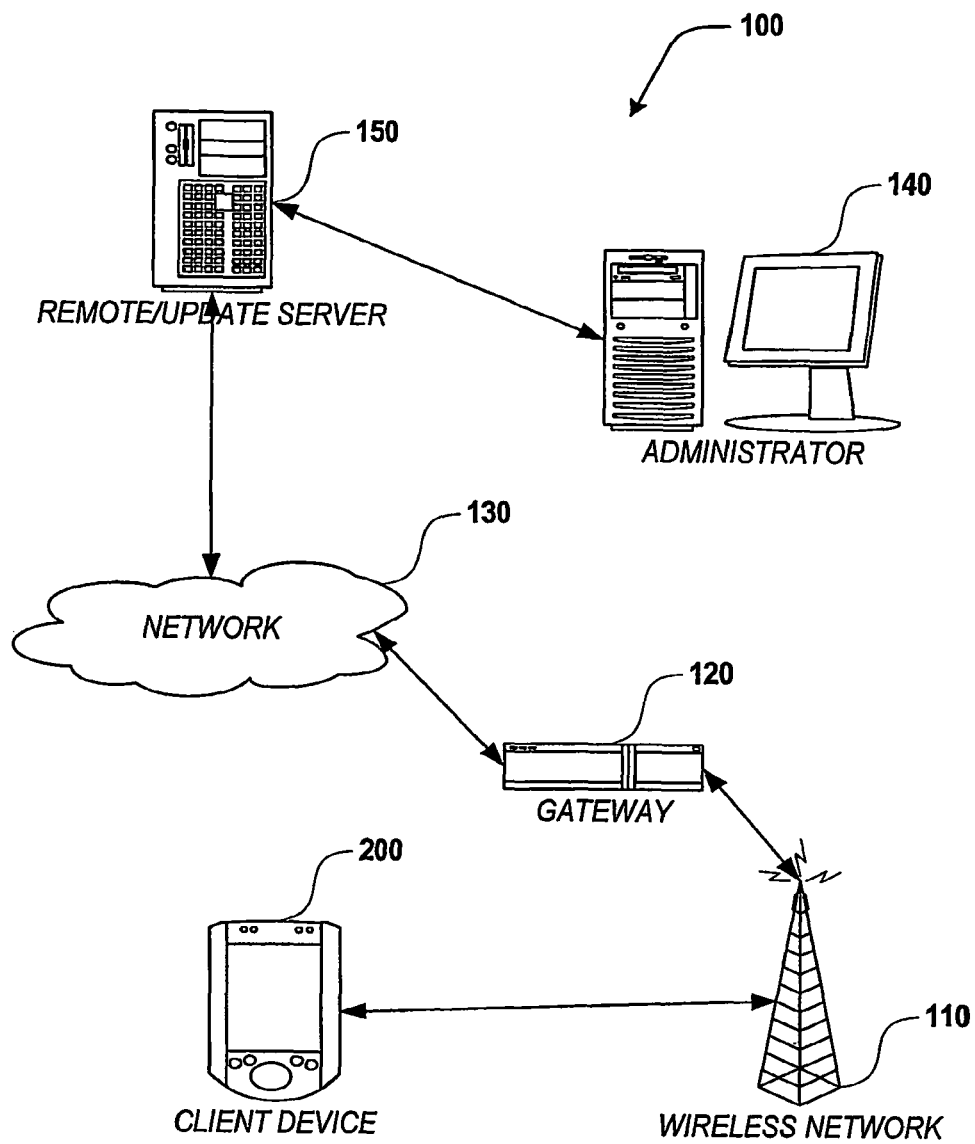
FIG. 1 is a pictorial diagram of a number of devices connected to a network which provide a client device, also connected to the network, with update and remote control services in accordance with embodiments of the present invention.

The detailed description which follows is represented largely in terms of processes and symbolic representations of the of operations by conventional computing components, including processors, memory storage devices for these processors, connected display devices and input devices, all of which are well-known in the art. These processes and operations may utilize conventional computing components in a heterogeneous distributed computer environment, including remote storage servers, computer servers and memory storage devices. Such processes, devices and operations also being known to those skilled in the art and others. Each of these conventional computing components may be accessible by the processors via a communications network.

The present invention includes a remote control application for wireless mobile devices. The remove control application allows a wireless communication service provider to remotely control a subscriber's wireless mobile device. In particular, the remote control application allows a wireless communications service provider to remotely lock a subscriber's wireless mobile device. Further, in an exemplary embodiment of the present invention, by invoking the update application described below, a user's data (including programs and operating system data) on a wireless mobile device can be updated without the user needing to intervene.

The remote control software application resides on a wireless mobile device and can allow secure remote administration of the wireless mobile device to cause specific tasks to be performed on the device, to cause the user interface ("UI") of the device to be locked from normal access, allow a remote administrator to cause files and data stored on the wireless mobile device to be erased, to allow a remote administrator to cause a backup to be performed on the wireless mobile device, and for a remote administrator to cause an update on data in the wireless mobile device.

The remote control application allows the remote administrator to seize control (either with or without a user's permission) of a wireless mobile device and in one exemplary embodiment, to do so with no visible indication as to the fact that control has been seized of the device.

The remote administrator will be able to use a unique device identifier ("ID") to log in and select various options. Special messages or instructions for the remote control application on the wireless mobile device are then placed in a secure queue on a server. Next, a "ping" message is sent to the wireless mobile device. The ping message is in turn processed by the remote control application on the wireless mobile device. The remote control application on the wireless mobile device then retrieves the special messages or instructions from the remote server and processes these instructions. In the exemplary embodiment of the present invention where the instructions include updating the wireless mobile device, the updating process will allow programs installed on the wireless mobile device to be automatically updated in a manner that can be controlled by the user in some cases and is completely automatic (e.g., controlled by the wireless service provider as instructions) in other cases.

Briefly, the update application on the wireless mobile device can update itself, update applications from a remote server, monitor a catalogue of application updates and additions on the server, monitor user activity via a unique device ID and/or other unique identifiers, launch by stub applications asking to be replaced by full applications and may further stop or resume downloads that have been interrupted.

As noted above, the update application may be activated in a number of different ways: (1) It may be launched as a normal stand alone application as to any other application launched on the wireless mobile device. (2) It may be launched by a stub application, with a specific path, to replace the stub application with its intended application (after download and successful install). To the user, they would launch the stub application, see a download in progress screen, followed by the actual application starting up. (3) As already noted above, the update application may be invoked using the remote control application and having the update application invoked by a remote administrator.

There are different types of updates and in various embodiments, the server will send updates in priority order. It will first send mandatory updates, then critical updates, then all others. Within each category, it will download the files in order of appearance. Mandatory updates are those updates that the update application will automatically (and silently) download and update whenever the update application is invoked and such an update is located. Critical updates are those that have been singled out as particularly important as they relate to fixing "bugs" in existing applications and/or providing increased security to a wireless mobile device. Normal updates are all the remaining types of updates.

Application and updates and be further categorized into "exclusive" updates. If an exclusive update is selected, no other selections can be made until the exclusive update is downloaded and installed. This category is particularly useful when installing updates that require a device reset, or updates that change the operating system files. The update application does not sent personal information to a remote server. Rather, it downloads from the server the list of available updates from which is parses and analyzes against the local wireless mobile device's computing environment.

As previously explained, embodiments of the present invention operate in a wireless network to communicate between wireless mobile devices and remote servers. It will be appreciated by those of ordinary skill in the art that other networks may be used in addition to a wireless network, e.g., the "Internet" which refers to a collection of networks and routers that can communicate between each other on a global level using the Internet Protocol ("IP") communications protocol.

FIG. 1 is a pictorial diagram of the exemplary wireless remote control and update system 100 for providing remote control and update services to wireless mobile devices such as client device 200 via a wireless network 110 and other networks 130. For ease of illustration, the client device 200 is shown pictorially as a PDA in FIG. 1, it being recognized that a large number of client devices in a variety of forms will be included in actual remote control and update system 100 employing embodiments of the present invention. In general, a client device 200 has computing capabilities and may be any form of device capable of communicating with the remote/update server 150 in various embodiments of the present invention. Thus, while client device 200 is pictorially shown as a PDA, a mobile computer, cellular phone and the like may be equally employed, although these are just representative devices and should be taken as illustrative and not limiting.

The remote control/update system 100 functions in a distributed computer environment that includes a plurality of client devices, interconnected by a wireless network 110 via a gateway 120 to other networks 130 to a remote control/update server 150. In addition, an administrator device 140 is connected with the remote control/update server 150 to pass instructions to the remote control/update server 150. All these connections and communications are interconnected via suitable network connections using suitable network communications protocols. As will be appreciated by those of ordinary skill in the art, the remote control/update server 150 may reside on any device accessible by the client device 200 shown in FIG. 1. An exemplary client device 200 is shown in detail in FIG. 2 and described below.

It will also be appreciated that while the remote control/update server 150 of the remote control/update system 100 is illustrated as a single device, the remote control/update server 150 may actually comprise more than a single device in an actual system practicing embodiments of the present invention. It will also be appreciated that the remote control/update server 150 may comprise file servers, database servers or a mixture of file servers and database servers.

Figure 2:
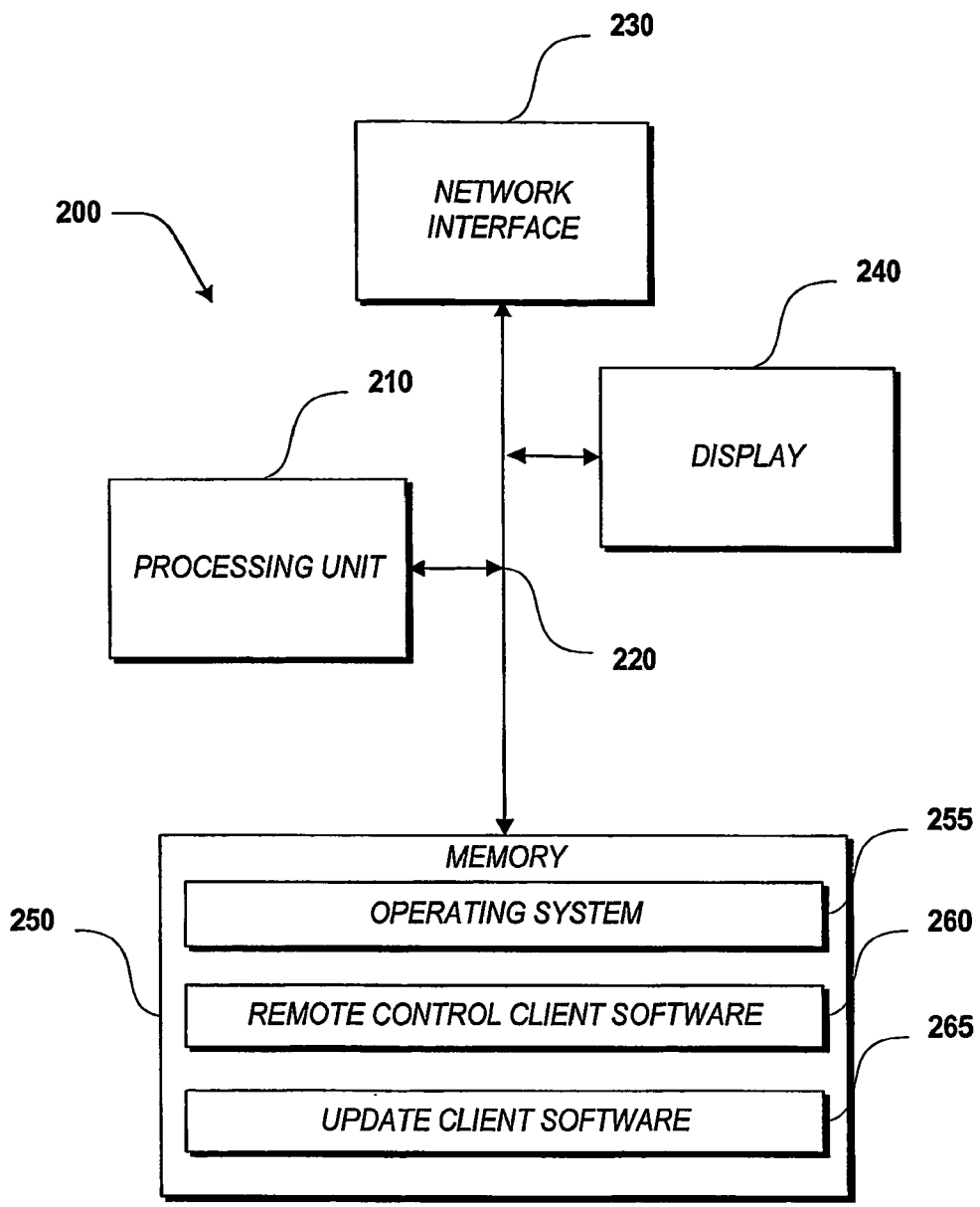
FIG. 2 is a block diagram of the client device that provides an exemplary operating environment for an embodiment of the present invention.

FIG. 2 illustrates an exemplary computing device 200 suitable for use in embodiments of the present invention. Those of ordinary skill in the art and others will appreciate that the computing device 200 may include many more components than those shown in FIG. 2. However, it is not necessary that all of these generally conventional components be shown in order to disclose an enabling embodiment for practicing the present invention. As shown in FIG. 2, the client device 200 includes a communications interface 230 for connecting to remote devices. Those of ordinary skill in the art will appreciate that the communications interface 230 includes the necessary circuitry, driver and/or transceiver for such a connection, and is constructed for use of the appropriate protocols for such a connection. In one embodiment of the present invention, the communications interface 230 includes the necessary circuitry for a wireless network connection.

The computing device 200 also includes a processing unit 210, a display 240 and a memory 250, all interconnected along with the communications interface 230 via a bus 220. Those of ordinary skill in the art and others will appreciate that the display 240 may not be necessary in all embodiments of the present invention and accordingly, is an optional component. The memory 250 generally comprises a random access memory ("RAM"), a read-only memory ("ROM"), and a permanent mass storage device, such as a disc drive, flash memory, or the like. The memory 250 stores and operating system 255, remote control software 260, and update software 265, formed in accordance with embodiments of the present invention. It will be appreciated that these software components may be loaded from a computer readable medium into memory 250 of the client device 200 using a drive mechanism (not shown) associated with the computer readable medium, such as a floppy, tape, DVD/CD ROM drive, flash memory or the communications interface 230.

Although an exemplary computing device 200 has been described, it general conforms to conventional computing devices, those of ordinary skill in the art and others will appreciate that a client device 200 may be any of a great number of computing devices capable of communicating remotely with other computing devices. In various embodiments of the present invention, the client device 200 may be a cellular phone, PDA, general purpose computing device and the like.

Figure 3:
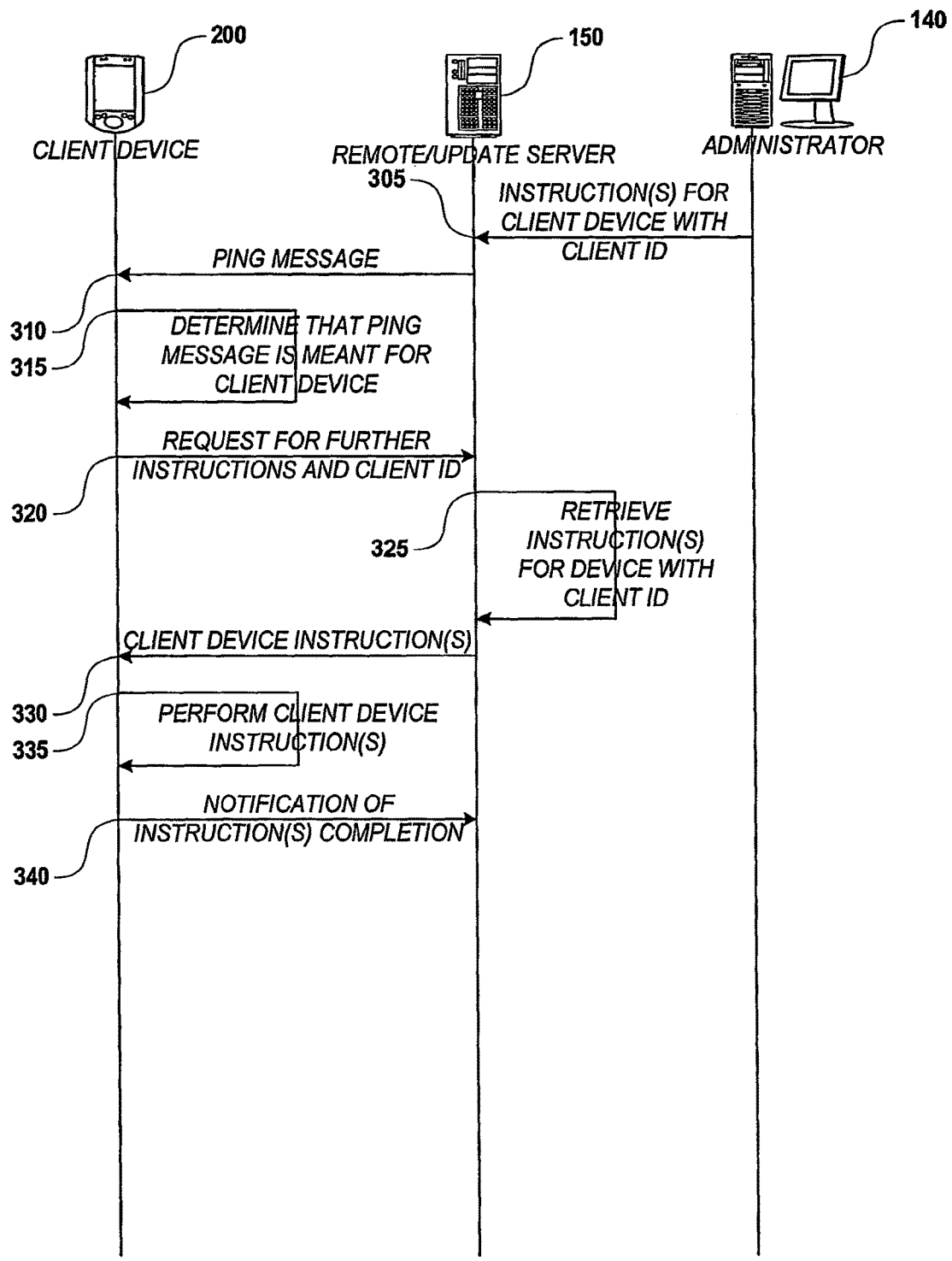
FIG. 3 is a diagram illustrating the actions taken by a client device, a remote control/update server and an administrator device to provide remote control services in accordance with embodiments of the present invention.

The operation of the remote control functionality of the remote control/update system 100 shown in FIG. 1 will be best understood by reference to FIG. 3 which includes one exemplary sequence of communication interactions between an administrator device 140, a remote control/update server 150 and a client device 200. The exemplary communication interaction shown in FIG. 3 begin with the administrator device 140 sending instructions 305 for the client device 200 along with a unique client device ID to the remote control/update server 150. The remote control/update server 150 then sends a "ping" message 310 to the client device 200. At the client device 200 a determination 315 is then made that the ping message was meant for that particular client device 200. Next, the client device 200 requests 320 further instructions for itself and includes its client ID. The remote control/update server 150 then retrieves 325 one or more instructions for the client device 200 with the sent client ID. These instructions are then sent back as client device instructions 330 to the client device 200. The client device 200 then performs 335 the client device instructions and notifies 340 the remote control/update server 150 that the client device instructions have been performed.

Figure 4:
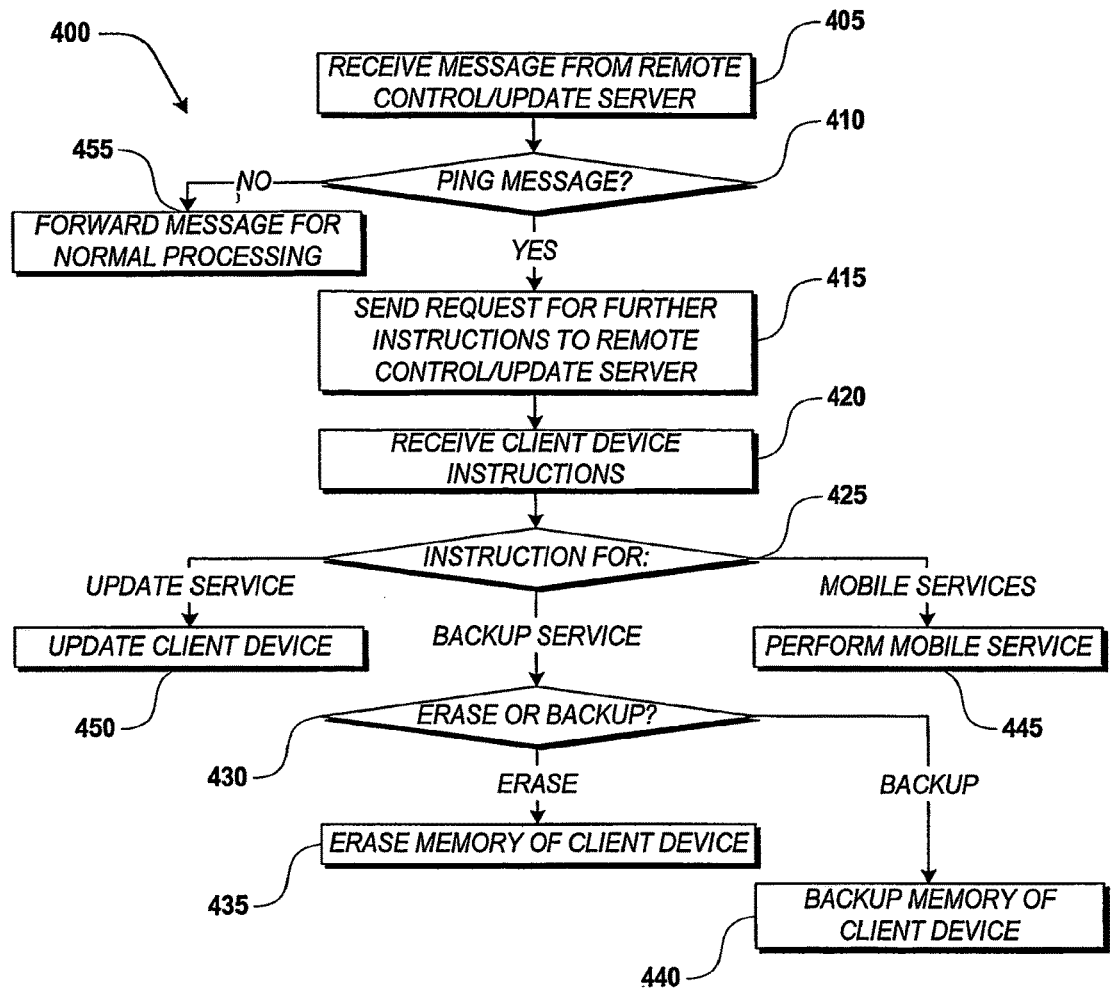
FIG. 4 is a flow diagram illustrating a client remote control routine in accordance with embodiments of the present invention.

FIG. 4 is a flow diagram illustrating an exemplary client-side remote control software routine suitable for implementation by the client device 200 for receiving and processing remote control instructions from the remote control/update server 150. The remote control routine 400 begins at block 405, where a message is received from the remote control/update server 150. Next, in decision block 410 a determination is made whether the message is a specially formatted "ping" message recognized by the remote control software 260. If in decision block 410 it was determined that the massage was not a ping message, then routine 400 proceeds to block 455 where the message is forwarded on for normal processing and remote control routine 400 ends.

Figure 6:
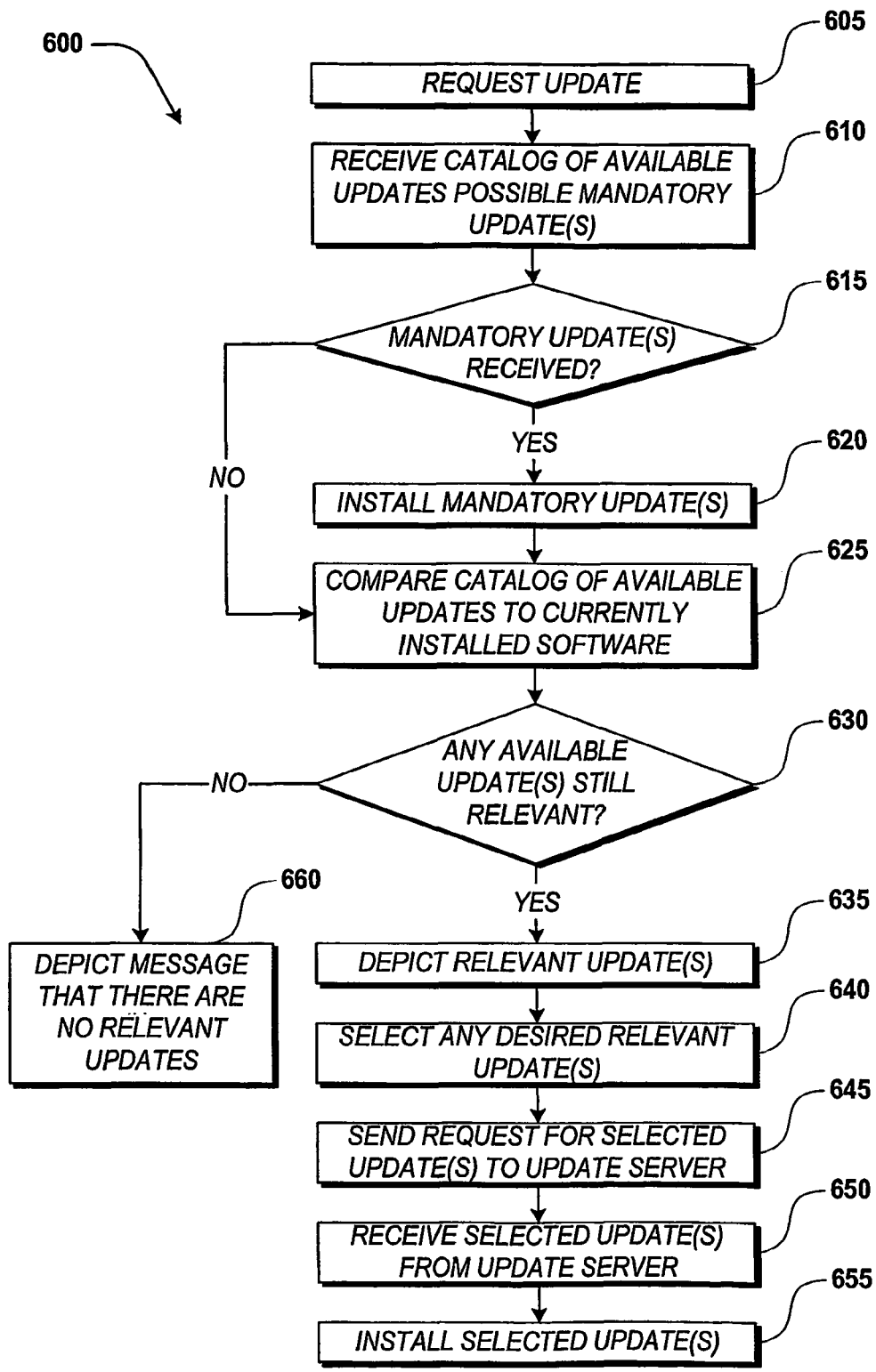
FIG. 6 is a flow diagram illustrating an update routine in accordance with embodiments of the present invention.
Figure 8:
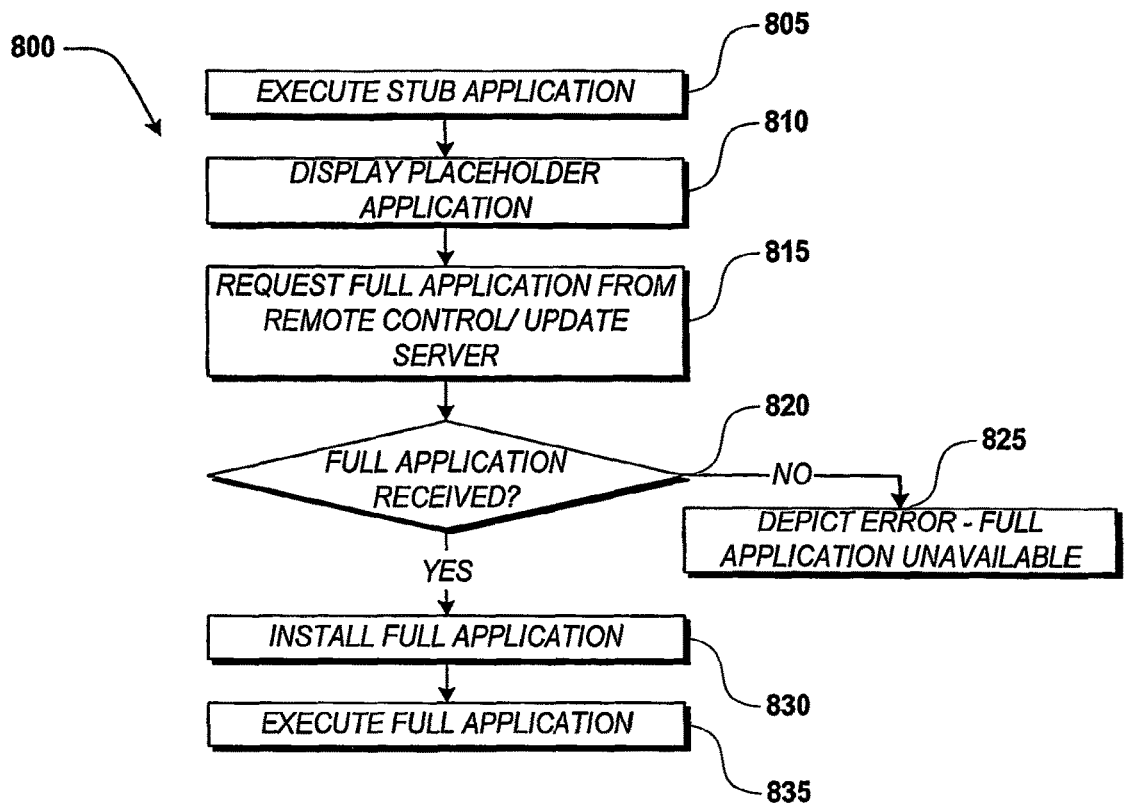
FIG. 8 is the flow diagram illustrating an alternate update routine in accordance with embodiments of the present invention.

If, however, in decision block 410 it was determined that the message was a ping message, then processing proceeds to block 415 where the client device 200 sends a request for further instructions to a remote server (e.g., remote control/update server 150). Those of ordinary skill in the art and others will appreciate that while only a single remote control/update server 150 is illustrated in FIG. 1, that more than one remote control server 150 may be employed in sending ping messages and storing instructions. Accordingly, in one embodiment, one remote server may send a ping message which may direct the client device 200 to another remote server to retrieve instructions. Accordingly, the request for further instructions in block 415 may be directed to the same or a different remote control/update server 150 as to the one that sent the ping message. Next, in block 420, the client device 200 receives the requested instructions. Similarly, while the request for instructions in block 415 may have been sent to one remote control/update server 150, yet another remote control/update server 150 may return the actual instructions to the client device 200. Next, in decision block 425, a determination is made as to what service the instructions are targeted for. If in decision block 425 it was determined that the instructions are targeted to an update service, then processing proceeds to block 450 where the client device 200 is updated. Exemplary client update routines are illustrated in FIGS. 6 and 8 and described below.

If, however, in decision block 425 it was determined that the instructions are targeted for mobile services, then processing proceeds to block 445 where mobile services are performed. Such mobile services may be any conventional mobile services that would apply to a wireless mobile device. However, in one exemplary embodiment of the present invention, these mobile services may include service for locking the UI of the client device 200.

If in decision block 425 it was determined that the instruction was targeted to the backup service then processing proceeds to decision block 430 where a further determination is made whether the instructions are directed to erasing or backing up data on the client device 200. If the determination in decision block 430 indicated that data is to be erased, then processing proceeds to block 435 where the memory of the client device is partially or completely erased as directed in the received instructions. In the alternative, where a backup instruction was issued for backing up the data on the client device 200, then processing proceeds to block 440 where some or all of the memory of the client device is backed up depending on the received instructions.

Those of ordinary skill in the art and others will appreciate that more types of instruction may be included in still other embodiments of the present invention. The inclusion of the messaging service, backup and update instructions is meant to be illustrative and not limiting. To better appreciate one such embodiment, FIGS. 5-8 include further description of the functionality of the present invention.

Figure 5:
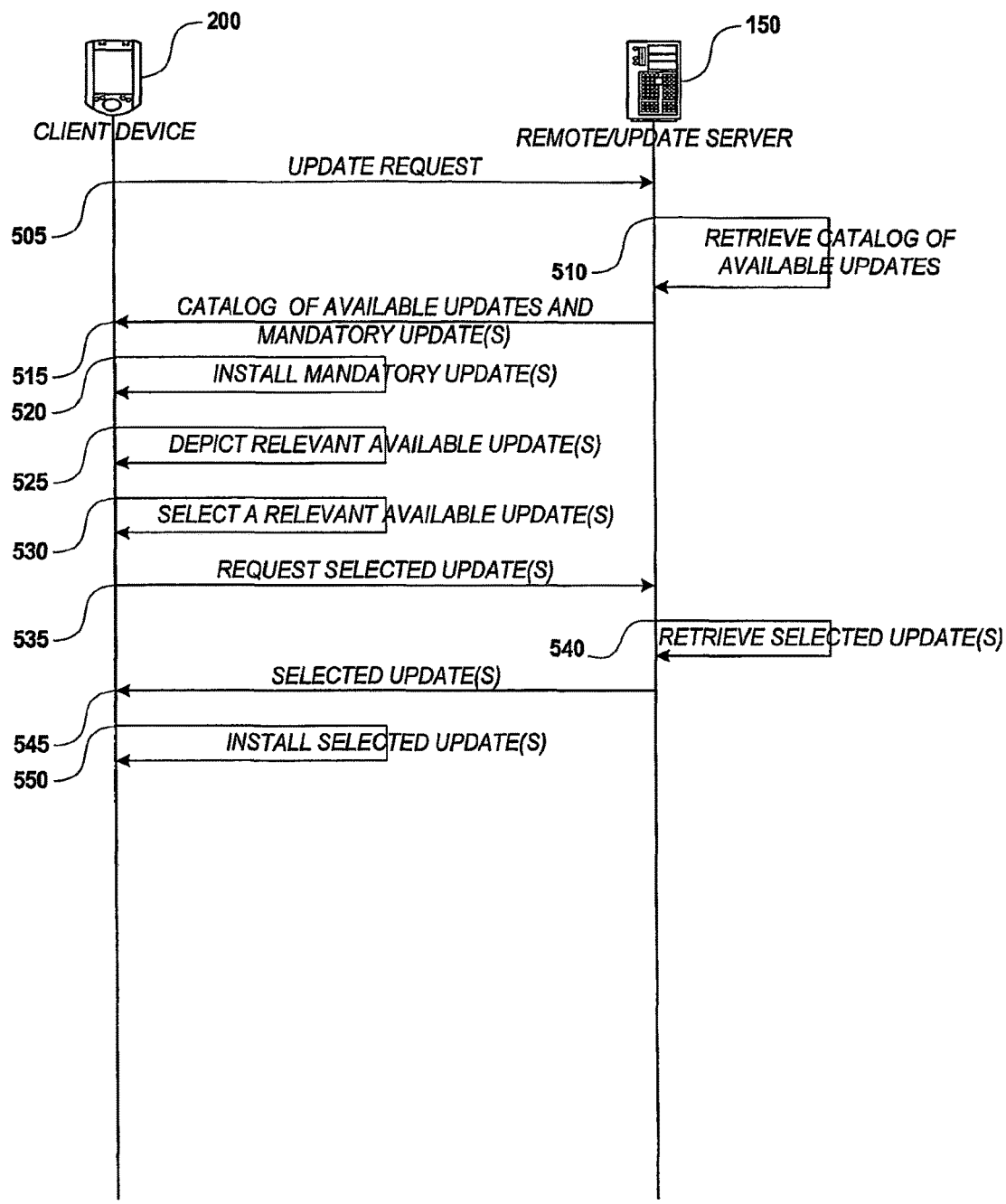
FIG. 5 is a diagram illustrating the actions taken by a client device, and a remote control/update server to provide update services in accordance with embodiments of the present invention.

The operation of an exemplary embodiment of the present invention having an update functionality implemented in the remote control/update system 100 shown in FIG. 1, will be best understood with reference to FIG. 5, which includes one exemplary sequence of communication interactions between a client device 200 and a remote control/update server 150. It will be appreciated by those of ordinary skill in the art that the communications from the client device 200 to the remote control/update server 150, may comprise wireless signals, including but not limited to: radio frequency ("RF") signals, optical signals, audio modulated signals and electromagnetic signals as well as conventional wire-based signals.

The exemplary communication interactions shown in FIG. 5 begin with the client device 200 sending an update request 505 to the remote control/update server 150. The remote control/update server 150 then retrieves 510 a catalog of available updates. The catalog of available updates is then sent 515 along with any mandatory updates back to the client device 200. As will be further described below mandatory updates are those updates which will be installed on the client device 200 regardless of a user's interaction. In various embodiments of the present invention, the user may or may not be notified that a mandatory update has been installed. Accordingly once the client device receives the mandatory updates, they are installed 520 on the client device 220.

The client device 200 next depicts 525 any relevant available updates on the client device 200 (e.g., via the display 240). The relevant available updates are those non-mandatory updates (i.e., critical updates and other updates) that have not already been installed on the client device 200 and for which the client device 200 has a use (e.g., that are applicable to the currently installed operating system and/or versions of software running on the client device 200).

One or more relevant available updates are selected 530 on the client device 200. Those of ordinary skill in the art and others will appreciate that the selection of relevant available updates may be accomplished in a variety of manners. In one exemplary embodiment of the present invention all relevant available critical updates are automatically selected while other updates may be selected by a user using any form of conventional user interface. Next the selected updates are requested 535 from the remote control/update server 150. The remote control/update server 150 retrieves 540 the selected update or updates and sends 545 the selected updates back to the client device 200. Once the client device 200 receives the selected updates, they are then installed 550 on the client device 200.

The remote control/update system 100 (described herein) includes a client device 200 whose software is to be updated via the remote control/update server 150. FIG. 6 is a flow diagram illustrating an exemplary client side update routine 600 suitable for implementation by the client device 200 for updating software on the client device from the remote control/update server 150.

The update routine 600 begins at block 605 where a update is requested from the remote control/update server 150. Next in block 610 a catalog of available updates is received along with any mandatory updates for the client device 200. In decision block 615 a determination is made whether any mandatory updates were received. If so then processing proceeds to block 620 where the mandatory updates are installed on the client device 200. Processing then proceeds to block 625. Also if in decision block 615 it was determined that no mandatory updates were received then processing continues to block 625. In block 625 the received catalog of available updates is compared to the currently installed software on the client device 200. Next in decision block 630 a determination is made whether any available updates in the catalog are still relevant to the client device 200. If in decision block 630 it is determined that no available updates are relevant to client device 200 then processing continues to block 660 where a message is depicted on the client device 600 that there are no relevant updates and routine 600 ends.

If, however, in decision block 630 it was determined that there are available updates that are still relevant to the client device 200, then in block 635 those relevant updates are depicted at the client device 200. Processing then proceeds to block 640 where any desired relevant updates are selected. As already noted, desired relevant updates may be selected in a variety of fashions according to any conventional selection mechanism. Next, in block 645 a request is sent to the remote control/update server 150 for the selected updates. The selected updates are received in block 650, and installed on the client device 200 in block 655.

Figure 7:
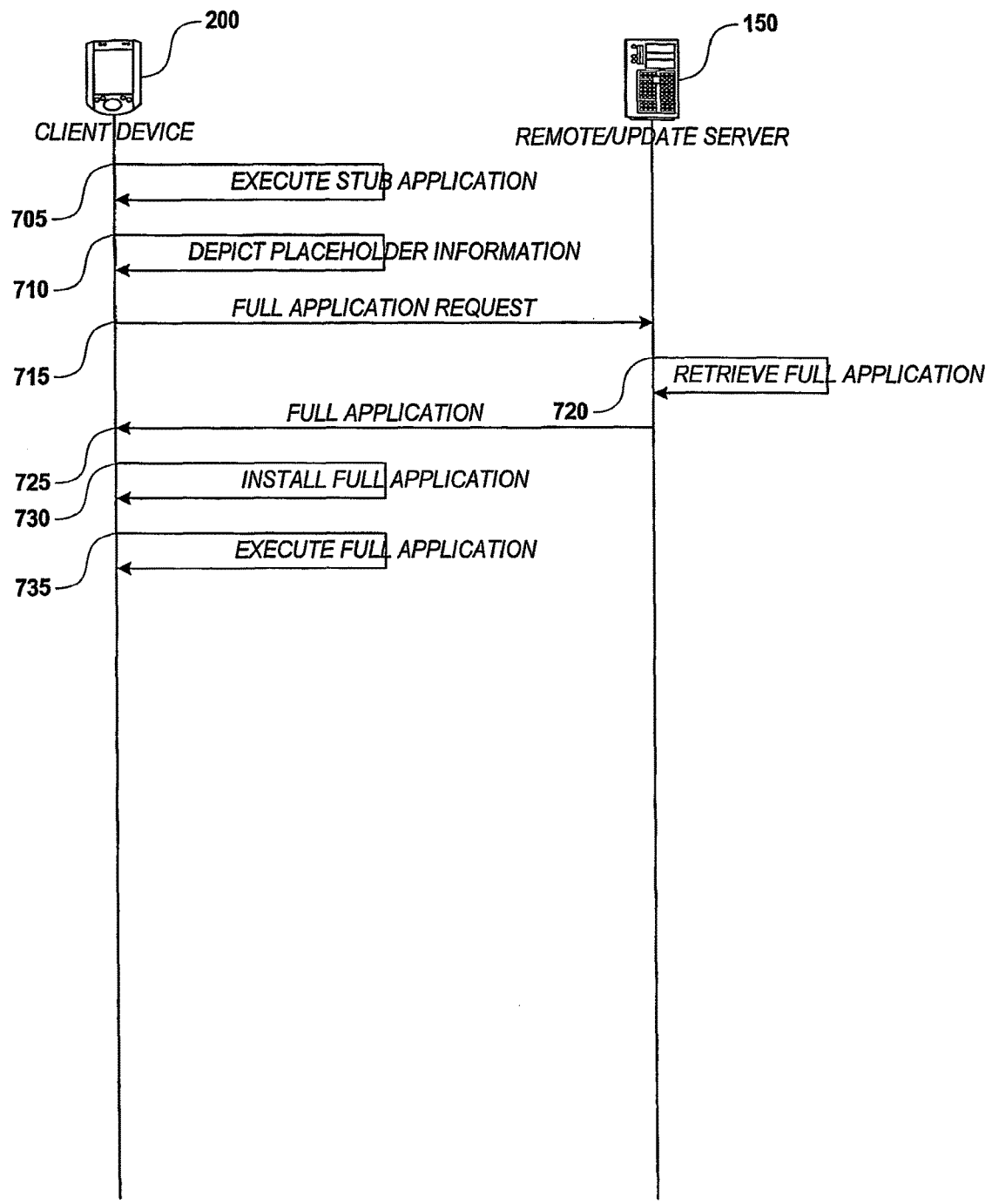
FIG. 7 is a diagram illustrating actions taken by a client device, and a remote control/update server to provide an alternate update service in accordance with embodiments of the present invention.

Similarly to FIG. 5, FIG. 7 illustrates an update session with communications between a client device 200 and a remote control/update server 150. However in the alternate update session illustrated in FIG. 7 the client device has a stub application that is automatically updated via the remote control/update server 150. The exemplary communications interactions shown in FIG. 7 begin with the client device 200 executing 705 a stub application. The client device 200 then depicts placeholder information 710 indicating that the application has been executed. Next the full application is requested 715 from the remote control/update server 150. The remote control/update server 150 retrieves the full application 720 and returns 725 the full application back to the client device 200. The client device 200 then installs 730 the full application. At which point the full application may then be executed 735.

The operations of the alternate update mechanism illustrated in FIG. 7 are further described within FIG. 8 which illustrates an alternate update routine 800 for implementation on the client device 200. The alternate update routine 800 replaces a stub application with a full application from a remote control/update server 150.

Alternate update routine 800 begins at block 805 with the execution of a stub application. Next in block 810 a placeholder for the full application is displayed. In block 815, the client device 200 sends a request to the remote control/update server 150 for the full application. In decision block 820 a determination is made whether the full application was received from the remote control/update server 150. If so, processing proceeds to block 830 where the full application is installed on the client device 200. After which, the full application can then be executed in block 835. If however in decision block 820 it was determined that the full application was not received then in block 825 an error is depicted indicating that the full application was not available.

Although various embodiments of the present invention have been illustrated and described, it will be appreciated that changes can be made therein without departing from the spirit and scope of the invention as defined by the appended claims. In particular it will be appreciated that while the processes and communication-interactions and the present interaction have been described in a particular order, those of ordinary skill in the art and other will appreciate that other orders of processes and/or communication interactions will also fall within the spirit and scope of the present invention.

What is claimed is:

1. A method of performing updates on a wireless communication apparatus, the method comprising:
receiving a "ping" message at the wireless communication apparatus;
requesting, by the wireless communication apparatus, further instructions regarding the "ping" message;
receiving, by the wireless communication apparatus, an instruction for update service, wherein the instruction for update service is received as at least a part of the further instructions regarding the "ping" message;
requesting, by the wireless communication apparatus, an update service;
receiving, by the wireless communication apparatus, one or more mandatory updates and a list of non-mandatory available updates;
automatically installing, by the wireless communication apparatus, the one or more mandatory updates;

automatically parsing and analyzing, by the wireless communication apparatus, the list of non-mandatory available updates against a computing environment of the wireless communication apparatus;

based on the parsing and analyzing, automatically identifying, by the wireless communication apparatus, from the list of non-mandatory available updates, one or more critical updates that are relevant to the computing environment of the wireless communication apparatus, and which one or more critical updates have not previously been installed on the wireless communication apparatus;

based on the parsing and analyzing, automatically identifying, by the wireless communication apparatus, from the list of non-mandatory available updates, non-critical updates that are relevant to the computing environment of the wireless communication apparatus, and which non-critical updates have not previously been installed on the wireless communication apparatus;

automatically selecting, by the wireless communication apparatus, the critical updates that are relevant to the computing environment of the wireless communication apparatus, and which critical updates have not previously been installed on the wireless communication apparatus, to obtain automatically selected updates;

enabling user selection of the non-critical updates that are relevant to the computing environment of the wireless communication apparatus, and which non-critical updates have not previously been installed on the wireless communication apparatus, to obtain user-selected updates;

automatically requesting and receiving, by the wireless communication apparatus, the automatically selected critical updates and the user selected non-critical updates, to obtain received updates; and automatically installing, by the wireless communication apparatus, the received updates.

2. The method of claim 1, wherein enabling user selection comprises automatically displaying the non-critical updates that are relevant to the computing environment of the wireless communication apparatus, and which non-critical updates have not previously been installed on the wireless communication apparatus.

3. The method of claim 1, wherein at least one of the one or more mandatory updates, at least one of the one or more critical updates, or at least one of the one or more non-critical updates is an exclusive update, and wherein the method further comprises:

installing the exclusive update; and delaying operations relating to any other update until after completion of installing the exclusive update.

4. The method of claim 1, further comprising:

automatically transmitting, by the wireless device, an update request, prior to receiving the one or more mandatory updates and the list of non-mandatory available updates.

5. A non-transitory computer-readable storage medium having stored thereon computer executable instructions configured to cause a wireless communication apparatus to perform operations, the operations comprising:

receiving a "ping" message at the wireless communication apparatus;

requesting, by the wireless communication apparatus, further instructions regarding the "ping" message;

receiving, by the wireless communication apparatus, an instruction for update service, wherein the instruction for update service is received as at least a part of the further instructions regarding the "ping" message;

requesting, by the wireless communication apparatus, an update service;

receiving one or more mandatory updates and a list of non-mandatory available updates;

automatically installing the one or more mandatory updates;

automatically parsing and analyzing the list of non-mandatory available updates against a computing environment of the wireless communication apparatus;

based on the parsing and analyzing, automatically identifying, from the list of non-mandatory available updates, one or more critical updates that are relevant to the computing environment of the wireless communication apparatus, and which one or more critical updates have not previously been installed on the wireless communication apparatus;

based on the parsing and analyzing, automatically identifying, from the list of non-mandatory available updates, non-critical updates that are relevant to the computing environment of the wireless communication apparatus, and which non-critical updates have not previously been installed on the wireless communication apparatus;

automatically selecting the critical updates that are relevant to the computing environment of the wireless communication apparatus, and which critical updates have not previously been installed on the wireless communication apparatus, to obtain automatically selected updates;

enabling user selection of the non-critical updates that are relevant to the computing environment of the wireless communication apparatus, and which non-critical updates have not previously been installed on the wireless communication apparatus, to obtain user-selected updates;

automatically requesting and receiving the automatically selected critical updates and the user selected non-critical updates, to obtain received updates; and automatically installing the received updates.

6. The storage medium of claim 5, wherein enabling user selection comprises automatically displaying the non-critical updates that are relevant to the computing environment of the wireless communication apparatus, and which non-critical updates have not previously been installed on the wireless communication apparatus.

7. The storage medium of claim 5, wherein at least one of the one or more mandatory updates, at least one of the one or more critical updates, or at least one of the one or more non-critical updates is an exclusive update, and wherein the operations further comprise:

installing the exclusive update; and delaying operations relating to any other update until after completion of installing the exclusive update.

8. The storage medium of claim 5, wherein the operations further comprise:

automatically transmitting an update request, prior to receiving the one or more mandatory updates and the list of non-mandatory available updates.

9. A wireless communication apparatus comprising:

at least one processor; and at least one memory having stored therein executable instructions configured to cause the wireless communication apparatus to perform operations comprising:

receiving a "ping" message at the wireless communication apparatus;

requesting, by the wireless communication apparatus, further instructions regarding the "ping" message;

receiving, by the wireless communication apparatus, an instruction for update service, wherein the instruction for update service is received as at least a part of the further instructions regarding the "ping" message;

requesting, by the wireless communication apparatus, an update service;

receiving one or more mandatory updates and a list of non-mandatory available updates;

automatically installing the one or more mandatory updates;

automatically parsing and analyzing the list of non-mandatory available updates against a computing environment of the wireless communication apparatus;

based on the parsing and analyzing, automatically identifying, from the list of non-mandatory available updates, one or more critical updates that are relevant to the computing environment of the wireless communication apparatus, and which one or more critical updates have not previously been installed on the wireless communication apparatus;

based on the parsing and analyzing, automatically identifying, from the list of non-mandatory available updates, non-critical updates that are relevant to the computing environment of the wireless communication apparatus, and which non-critical updates have not previously been installed on the wireless communication apparatus;

automatically selecting the critical updates that are relevant to the computing environment of the wireless communication apparatus, and which critical updates have not previously been installed on the wireless communication apparatus, to obtain automatically selected updates;

enabling user selection of the non-critical updates that are relevant to the computing environment of the wireless communication apparatus, and which non-critical updates have not previously been installed on the wireless communication apparatus, to obtain user-selected updates;

automatically requesting and receiving the automatically selected critical updates and the user selected non-critical updates, to obtain received updates; and automatically installing the received updates.

10. The wireless communication apparatus of claim 9, wherein enabling user selection comprises automatically displaying the non-critical updates that are relevant to the computing environment of the wireless communication apparatus, and which non-critical updates have not previously been installed on the wireless communication apparatus.

11. The wireless communication apparatus of claim 9, wherein at least one of the one or more mandatory updates, at least one of the one or more critical updates, or at least one of the one or more non-critical updates is an exclusive update, and wherein the operations further comprise:

installing the exclusive update; and delaying operations relating to any other update until after completion of installing the exclusive update.

12. The wireless communication apparatus of claim 9, wherein the operations further comprise:

automatically transmitting an update request, prior to receiving the one or more mandatory updates and the list of non-mandatory available updates.

13. The wireless communication apparatus of claim 9, further comprising communications interface circuitry.

* * * * *